(12) United States Patent
Hyde et al.

(10) Patent No.: US 7,348,858 B2
(45) Date of Patent: Mar. 25, 2008

(54) PHOTONIC DIODE

(76) Inventors: Roderick A. Hyde, 1115 Wynn Cir., Livermore, CA (US) 94550; Nathan P. Myhrvold, 7939 Overlake Dr., Medina, WA (US) 98039; Clarence T. Tegreene, 10629 NE. 17th St., Bellevue, WA (US) 98004-2834; Lowell L. Wood, Jr., 1185 Hillcrest Ave., Livermore, CA (US) 94550-4921

( * ) Notice: Subject to any disclaimer, the term of this patent is extended or adjusted under 35 U.S.C. 154(b) by 292 days.

(21) Appl. No.: 11/323,471

(22) Filed: Dec. 30, 2005

(65) Prior Publication Data

US 2007/0152287 A1 Jul. 5, 2007

(51) Int. Cl.
*H03B 28/00* (2006.01)
*G02F 1/00* (2006.01)

(52) U.S. Cl. .......................... 331/45; 359/896
(58) Field of Classification Search ............... 331/45, 331/50, 56, 96, 107 P; 359/896
See application file for complete search history.

(56) References Cited

U.S. PATENT DOCUMENTS 4,097,817 A * 6/1978 Thoren et al. ............... 331/56
2005/0107060 A1* 5/2005 Ye .............................. 455/307

OTHER PUBLICATIONS

Figotin, A.; Vitebsky, I.; "Nonreciprocal magnetic photonic crystals"; Physical Review E; bearing dates of May 24, 2001, received on Jan. 9, 2001 and 2001; pp. 1-17; vol. 63, No. 066609; The American Physical Society.

Guo, Junpeng; Brady, David; "Fabrication of thin-film micropolarizer arrays for visible imaging polarimetry"; Applied Optics; bearing dates of Apr. 1, 2000, received on Dec. 17, 1999, revised manuscript received Dec. 16, 1999 and 2000; pp. 1486-1492; vol. 39, No. 10.

Shalaev, Vladimir M.; Cai, Wenshan; Chettiar, Uday K.; Yuan, Hsiao-Kuan; Sarychev, Andrey K.; Drachev, Vladimir P. and Kildishev, Alexander V.; "Negative index of refraction in optical metamaterials"; Optics Letters; bearing dates of Dec. 15, 2005, received on Sep. 13, 2005, accepted on Oct. 14, 2005 and 2005; pp. 3356-3358; vol. 30, No. 24; Optical Society of America.

Denysenkov, V.; Jalali-Roudsar, A.; Adachi, N.; Khartsev, S.; Grishin, A.; Okuda, T.; "Ferromagnetic Resonance in Single Crystal Bismuth Iron Garnet Films"; Materials Research Society Symposium Proceedings—Materials Issues for Tunable RF and Microwave Devices; Symposium held Nov. 30 through Dec. 2, 1999, and bearing a date of 2000; pp. 107-112; vol. 603; Materials Research Society, Warrendale, Pennsylvania.

* cited by examiner

*Primary Examiner*—David Mis

(57) ABSTRACT

An element for interacting with electromagnetic radiation is disclosed, including a first self-resonant body, a second self-resonant body, and a directional device interposed between the first self-resonant body and the second self-resonant body. The directional device is adapted to inhibit propagation of electromagnetic radiation from the second self-resonant body to the first self-resonant body.

52 Claims, 8 Drawing Sheets

Fig. 1
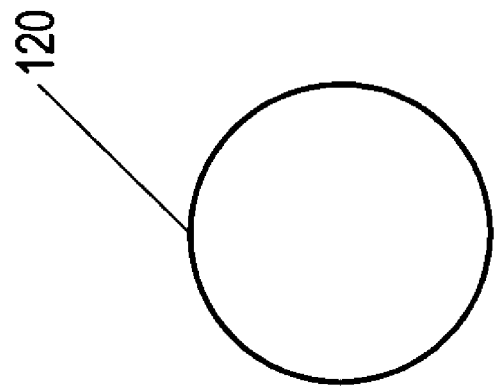
120
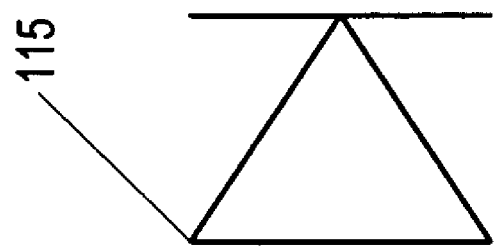
115
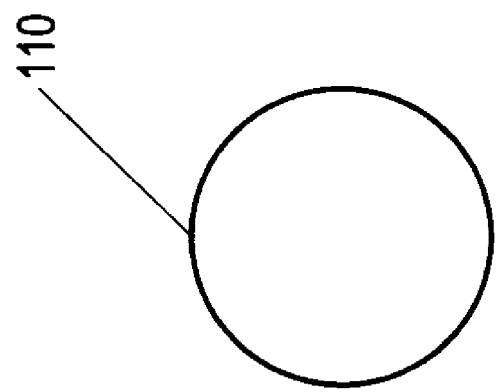
110

PHOTONIC DIODE

TECHNICAL FIELD

The present application relates, in general, to photonic circuits.

SUMMARY

In one respect, disclosed is an apparatus for interacting with electromagnetic radiation including: a first self-resonant body; a second self-resonant body; and a directional device between the first self-resonant body and the second self-resonant body, the directional device being adapted to inhibit propagation of a first electromagnetic radiation signal from the second self-resonant body to the first self-resonant body.

In another respect, disclosed is an electromagnetic radiation element including: a first set of one or more resonators, the first set of resonators being adapted to facilitate the propagation of electromagnetic radiation signals; a second set of one or more resonators, the second set of resonators being adapted to facilitate the propagation of electromagnetic radiation; and a directional device functionally between all or a portion of the first set of resonators and all or a portion of the second set of resonators, the directional device being adapted to inhibit a first electromagnetic signal received from the second set of resonators to propagate to the first set of resonators, and the directional device being adapted to permit a second electromagnetic signal received from the first set of resonators to propagate to the second set of resonators.

In yet another respect, disclosed is a method of directing electromagnetic energy, including: resonantly interacting with a portion of the electromagnetic energy at a first location; selectively permitting propagation of at least one portion of the electromagnetic energy from the first location to a second location; resonantly interacting with the propagated at least one portion of the electromagnetic energy at the second location; and selectively inhibiting propagation of at least a portion of the electromagnetic energy from the second location to the first location.

In yet another respect, disclosed is a method for producing an element for interacting with electromagnetic radiation signals, including: identifying a first resonator adapted to resonate at a first frequency; identifying a second resonator adapted to resonate at the first frequency; identifying a directional device; and interposing the directional device functionally between the first resonator and the second resonator, the directional device being adapted to inhibit a first electromagnetic signal at the first frequency from propagating from the second resonator to the first resonator, and the directional device being adapted to substantially permit a second electromagnetic signal at the first frequency from propagating from the first resonator to the second resonator.

In yet another respect, disclosed is a method for producing an apparatus for interacting with electromagnetic radiation including: interposing a directional device functionally between a first self-resonant body and a second self-resonant body, the directional device being adapted to inhibit a first electromagnetic radiation signal received from the second self-resonant body to propagate to the first self-resonant body.

BRIEF DESCRIPTION OF THE FIGURES

Other objects and advantages of the invention may become apparent upon reading the detailed description and upon reference to the accompanying drawings.

FIG. 1 is a block diagram illustrating a photonic diode, including a directional device interposed functionally between two self-resonant bodies, in accordance with some of the embodiments.

DETAILED DESCRIPTION

Figure 2:
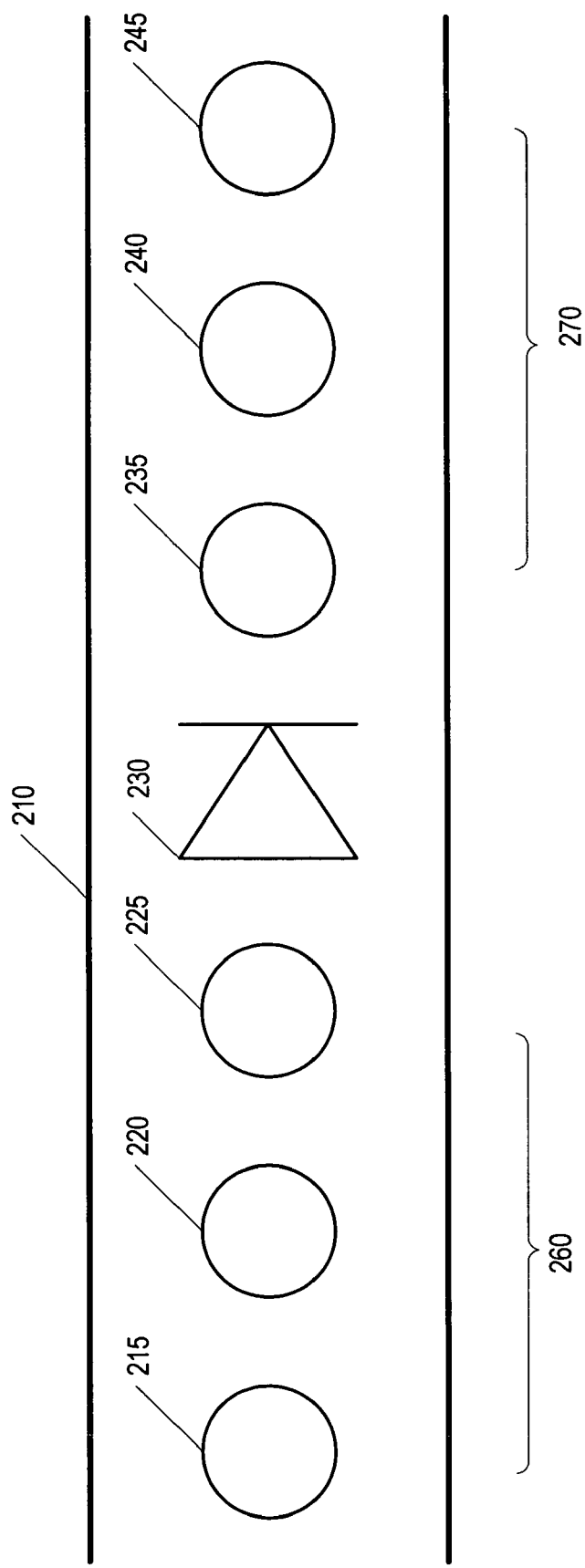
FIG. 2 is a block diagram illustrating a photonic diode, including a directional device interposed functionally between two sets of self-resonant bodies, in accordance with some of the embodiments.

One or more embodiments are described below. It should be noted that these embodiments are exemplary and are intended to be illustrative rather than limiting. It is impossible to include all of possible embodiments and contexts of the invention in this disclosure.

Referring to FIG. 1, a block diagram illustrating a photonic diode, including a directional device interposed functionally between two self-resonant bodies (resonators), in accordance with some of the embodiments is shown. Directional device 115 is interposed between self-resonant body 110 and self-resonant body 120. The directional device is adapted to inhibit substantially propagation of electromagnetic radiation in at least one direction. Directional device 115 may inhibit, for example, electromagnetic radiation from propagating from self-resonant body 120 to self-resonant body 110 and may permit electromagnetic radiation to propagate from self-resonant body 110 to self-resonant body 120.

In one embodiment, self-resonant body 110, directional device 115, and self-resonant body 120 may be arranged as shown in the figure to facilitate propagation of electromagnetic radiation from self-resonant body 110 to self-resonant body 120. In other embodiments, directional device 115 may be interposed functionally (for example, propagationally) between self-resonant body 110 and self-resonant body 120. If, for example, directional device 115 is adapted to change a direction of incident electromagnetic radiation by 90° or 180°, the arrangement of one or more of the devices may be changed accordingly so that electromagnetic radiation can propagate from self-resonant body 110 to self-resonant body 120. That is, self-resonant body 120 may be placed below directional device 115 instead of to the right of directional device 115.

In another embodiment, the photonic diode may include a first set of self-resonant bodies that includes first resonant body 110 and a second set of self-resonant bodies that includes second self-resonant body 120. In this embodiment, directional device 115 may be adapted to inhibit substantially electromagnetic radiation from propagating from the second set of self-resonant bodies to the first set of self-resonant bodies and may be adapted to permit substantially electromagnetic radiation from propagating from the first set of self-resonant bodies to the second set of self-resonant bodies. In one embodiment, the first and second set of self-resonant bodies may be arrays of self-resonant bodies. The arrays may be one-dimensional, two-dimensional, or three-dimensional.

In one embodiment, the photonic diode may include additional directional devices that are also adapted to inhibit substantially electromagnetic radiation propagation in at least one direction. The additional directional devices may be interposed before self-resonant body 110 or after self-resonant body 120. Furthermore, in an embodiment where additional self-resonant bodies are present, the additional directional devices may be interposed between selected ones of the additional self-resonant bodies. For example, a third self-resonant body may be present and a second directional device may be interposed between self-resonant body 120 and the third self-resonant body.

In one embodiment, the directional device may include an optical isolator. The isolator may include a first polarizer adapted to polarize linearly incident electromagnetic energy along a first axis and a second polarizer adapted to polarize linearly incident electromagnetic radiation along a second axis, the second axis being different from the first axis. In one embodiment, the second axis may be oriented at 45° with respect to the first axis. A rotator adapted to rotate an axis of polarization by 45° may be interposed between the first and the second polarizers such that electromagnetic radiation incident on the second polarizer is inhibited substantially from propagating through the first polarizer and electromagnetic radiation incident on the first polarizer is permitted to propagate through the second polarizer.

In one embodiment, self-resonant body 110, directional device 115, and self-resonant body 120, as well as additional self-resonant bodies and additional directional devices, may be embedded in a photonic crystal. The photonic crystal may operate as a waveguide to facilitate propagation and steering of the electromagnetic energy. In yet another embodiment, self-resonant body 110 and self-resonant body 120, as well additional self-resonant bodies, may be embedded in a nonreciprocal magnetic photonic crystal adapted to operate as a directional device to inhibit substantially electromagnetic radiation from propagating in at least one direction through the crystal.

The self-resonant bodies may include any object adapted to resonate at a desired mode or frequency in the electromagnetic spectrum. In one embodiment, the self-resonant bodies may be high Q resonators with relatively narrow bandwidth resonances, and resulting efficient propagation of electromagnetic radiation at the resonant frequency. Examples of self-resonant bodies may include, for example, nanorods, antennas, atoms, and quantum dots. Other suitable resonators may be used, however.

Referring to FIG. 2, a block diagram illustrating a photonic diode, including a directional device interposed functionally between two sets of self-resonant bodies, in accordance with some of the embodiments is shown. In one embodiment, photonic diode 210 includes first set of self-resonant bodies 260, directional device 230, and second set of self-resonant bodies 270. Self-resonant body 215, self-resonant body 220, and self-resonant body 225 are included in first set of self-resonant bodies 260 and self-resonant body 235, self-resonant body 240, and self-resonant body 245 are included in second set of self-resonant bodies 270.

In one embodiment, directional device 230 may be interposed between self-resonant body 225 and self-resonant body 235. Directional device 230 is adapted to inhibit substantially electromagnetic energy received from second set of self-resonant bodies 270 from propagating to first set of self-resonant bodies 260 and to permit substantially electromagnetic energy from propagating from first set of self-resonant bodies 260 to second set of self-resonant bodies 270.

In one embodiment, the first and second sets of self-resonant bodies may be arrays of self-resonant bodies. The arrays may be one-dimensional, two-dimensional, or three-dimensional. Other arrangements of the self-resonant bodies may also be possible.

Figure 3:
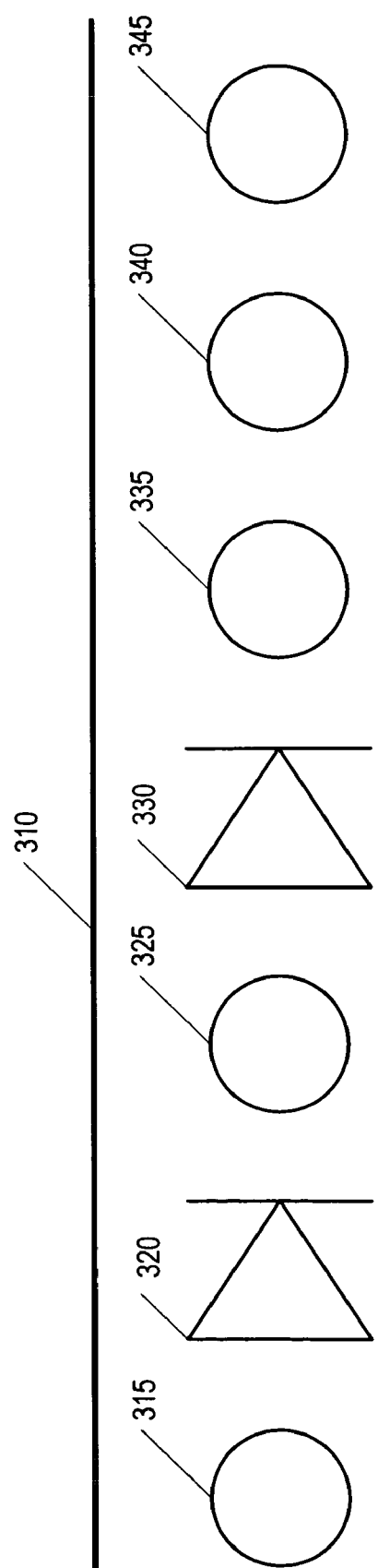
FIG. 3 is a block diagram illustrating a photonic diode, including two directional devices interposed functionally between self-resonant bodies, in accordance with some of the embodiments.

Referring to FIG. 3, a block diagram illustrating a photonic diode, including two directional devices interposed functionally between self-resonant bodies, in accordance with some of the embodiments is shown. In one embodiment, photonic diode 310 may include two or more directional devices. As shown in the figure, the photonic diode includes self-resonant body 315, directional device 320, self-resonant body 325, directional device 330, and self-resonant bodies 335, 340, 345. Additional arrangements of the devices are also possible. Additional directional devices, for example, may be interposed between selected ones of the self-resonant bodies. Furthermore, two or more self-resonant bodies may be interposed between or on either side of the directional devices. The self-resonant bodies may be also arranged in arrays (one-, two-, or three-dimensional) to facilitate propagation of electromagnetic radiation.

Figure 4:
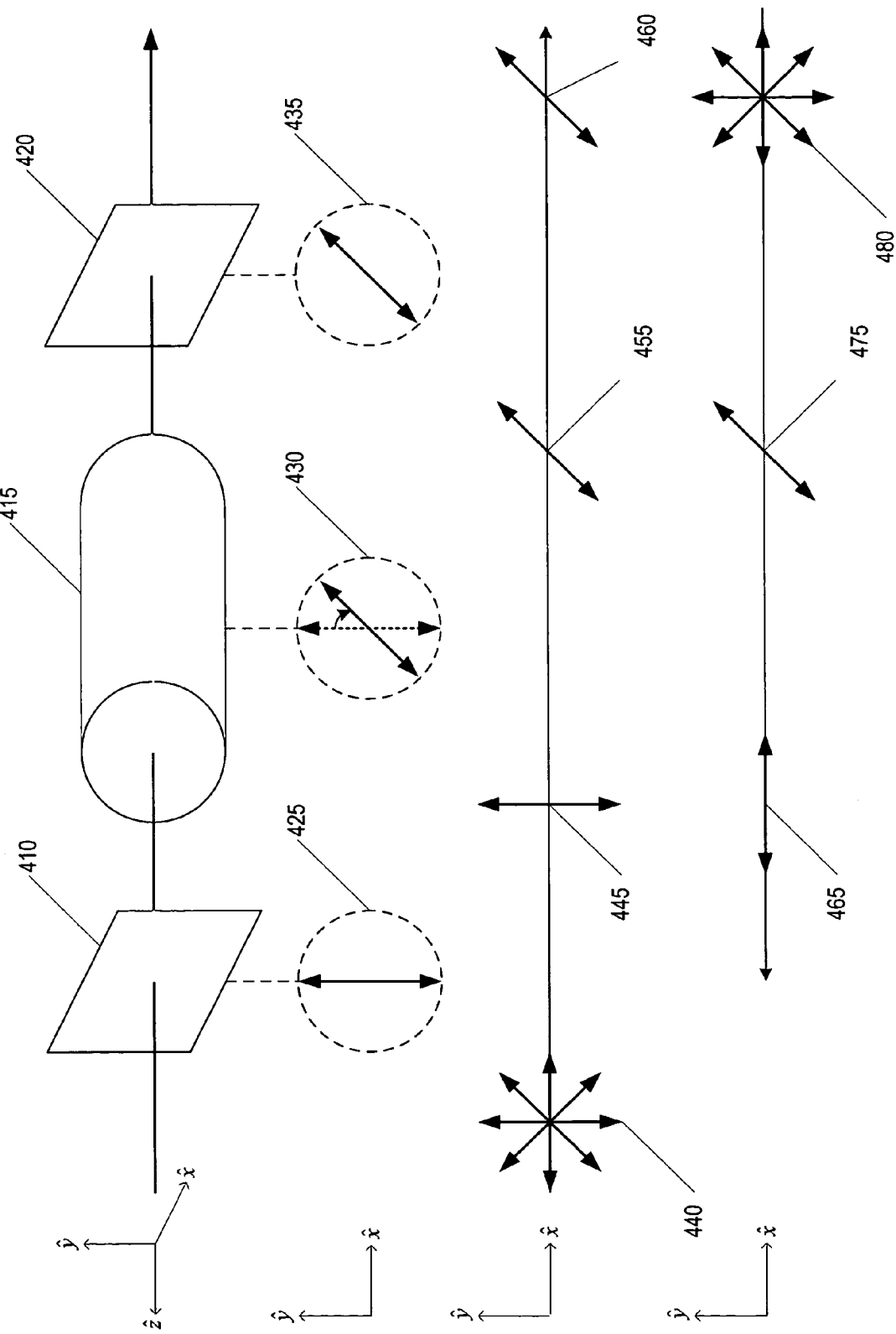
FIG. 4 is a block diagram illustrating an isolator, including a rotator interposed functionally between two polarizers, in accordance with some of the embodiments.

Referring to FIG. 4, a block diagram illustrating an isolator, including a rotator interposed functionally between two polarizers, in accordance with some of the embodiments is shown. Polarizer 410 is adapted to polarize linearly incident electromagnetic radiation along a first axis. In one embodiment, polarizer 410 may be adapted to polarize incident electromagnetic radiation along the ŷ axis as is shown in diagram 425. Polarizer 420 is adapted to polarize linearly incident electromagnetic radiation along a second axis. In one embodiment, polarizer 420 may be adapted to polarize incident electromagnetic radiation along an axis that is 45° to the ŷ axis (which is also at an angle of 45° to the first axis) as is shown in diagram 435. In an embodiment where small-scale polarizers may be required, polarizing material may be used as described by Guo et al. in a paper in *Applied Optics* (*Fabrication of thin-film micropolarizer arrays for visible imaging polarimetry; Junpeng Guo and David Brady; Applied Optics;* Vol. 39, No. 10; 1 April 2000), which is incorporated herein by reference. The polarizers may also be manufactured using negative index of refraction materials as described in a paper by Shalaev et al. (*Negative index of refraction in optical metamaterials*; Shalaev et al.; V. M. Shalaev, W. Cai, U. K. Chettiar, H.-K. Yuan, A. K. Sarychev, V. P. Drachev, and A. V. Kildishev; *OPTICS LETTERS,* Vol. 30, No. 24, 3356 (2005)), which is also incorporated herein by reference.

Rotator 415 is interposed functionally between polarizer 410 and polarizer 420. Rotator 415 is adapted to rotate a polarization axis of incident radiation by a number of degrees. In one embodiment, rotator 415 is adapted to rotate an axis of polarization of incident radiation by 45° as is shown in diagram 430. In one embodiment, the rotator may be a Faraday rotator manufactured from Bismuth Iron Garnet Film as described in a paper by Denysenkov et al. (*Ferromagnetic resonance in single-crystal bismuth iron garnet films*; V. P. Denysenkov, Alex Grishin, Takashi Okuda, Nobuyasu Adachi; MRS Fall 1999 meeting (KK3.6), Boston; Nov. 29-Dec. 3 (1999)), which is incorporated herein by reference.

In an example demonstrating propagation of electromagnetic radiation through the isolator in the negative $\hat{z}$ direction, polarizer 410 is adapted to polarize along the $\hat{y}$ axis incident unpolarized electromagnetic radiation 440 to yield linearly polarized electromagnetic radiation 445. Rotator 415 is then adapted to rotate a polarization axis of polarized electromagnetic radiation 445 clockwise (with respect to the direction of the incident radiation) by 45° to yield rotated polarized electromagnetic radiation 455. Finally, polarizer 420 is adapted to polarize incident rotated polarized electromagnetic radiation 455 along a direction that is 45° from the $\hat{y}$ axis. The incident electromagnetic radiation is permitted to propagate through polarizer 420 to yield electromagnetic radiation 460, which remains substantially unchanged since the incident electromagnetic radiation is polarized along the axis of polarization of polarizer 420.

In an example demonstrating propagation of electromagnetic radiation through the isolator in the positive $\hat{z}$ direction, polarizer 420 is adapted to polarize along a direction that is 45° to the $\hat{y}$ axis incident unpolarized electromagnetic radiation 480 to yield polarized electromagnetic radiation 475. Rotator 415 is then adapted to rotate a polarization axis of polarized electromagnetic radiation 475 clockwise (with respect to the direction of the incident radiation) by 45° to yield rotated polarized electromagnetic radiation 465, which is substantially polarized along the $\hat{x}$ axis. Finally, polarizer 410 is adapted to polarize incident rotated polarized electromagnetic radiation 465 along the $\hat{y}$ axis. Since incident electromagnetic radiation 465 is substantially polarized along the $\hat{x}$ axis (which is 90° from the polarization axis of polarizer 410), the incident electromagnetic radiation is inhibited substantially from propagating through polarizer 410. Thus, electromagnetic radiation is inhibited substantially from propagating through the isolator in the positive $\hat{z}$ direction.

Figure 5:
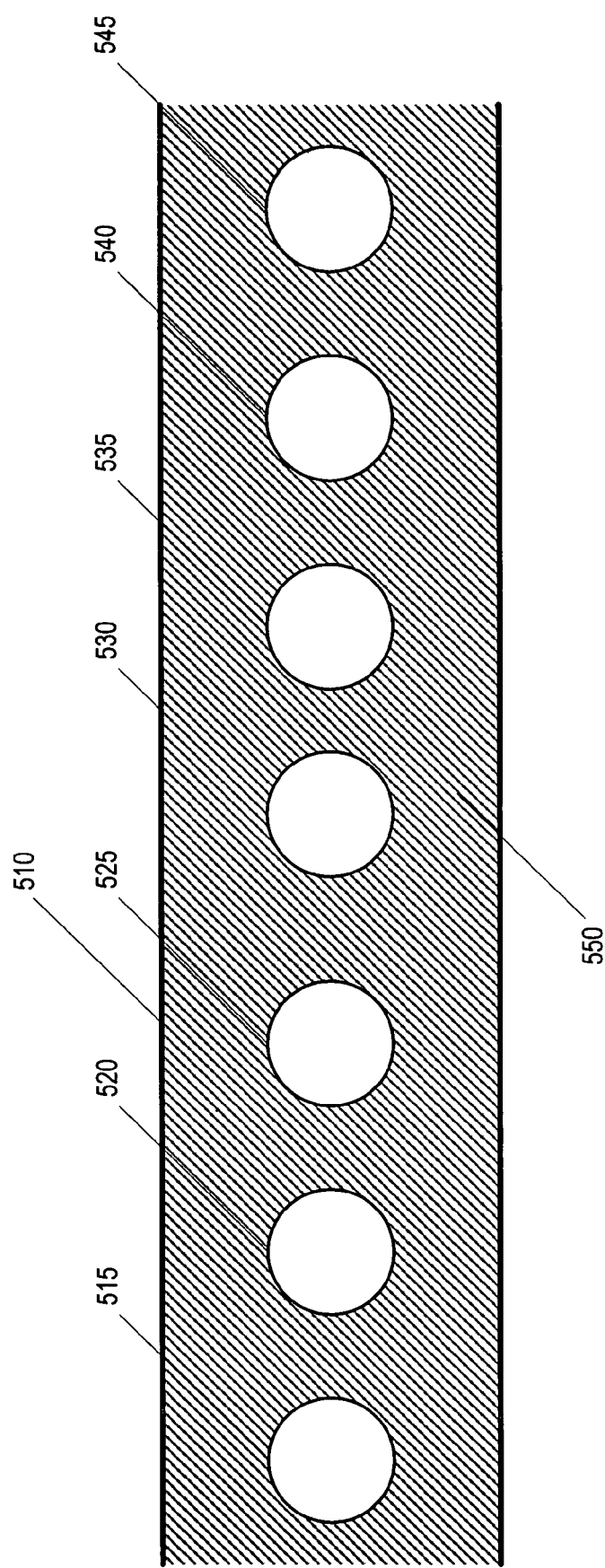
FIG. 5 is a block diagram illustrating a photonic diode, including self-resonant bodies interposed in a non-reciprocal photonic crystal, in accordance with some of the embodiments.

Referring to FIG. 5, a block diagram illustrating a photonic diode, including self-resonant bodies embedded in a non-reciprocal photonic crystal, in accordance with some of the embodiments is shown. In one embodiment, the directional device of photonic diode 510 may include nonreciprocal photonic crystal 550. Nonreciprocal photonic crystals (also known as magnetic photonic crystals) are adapted to inhibit substantially propagation of electromagnetic radiation in one direction. Properties of nonreciprocal magnetic photonic crystals are described in a paper by Figotin, et al. (*Nonreciprocal magnetic photonic crystals*; A. Figotin, I. Vitebsky; Physical Review E, Vol. 63, 066609; 24 May 2001), which is incorporated herein by reference. As shown in FIG. 5, in one embodiment, nonreciprocal photonic crystal 550 may be adapted to permit substantially electromagnetic radiation to propagate from left to right and to inhibit substantially electromagnetic radiation from propagating from right to left.

In one embodiment, resonators 515, 520, 525, 530, 535, 540, and 545 may be embedded into nonreciprocal photonic crystal 550. In another embodiment, nonreciprocal photonic crystal material may be placed only between selected resonators. The resonators and the nonreciprocal photonic crystal material may also be embedded in a photonic crystal that may operate as waveguide to facilitate the propagation and steering of the electromagnetic radiation.

Figure 6:
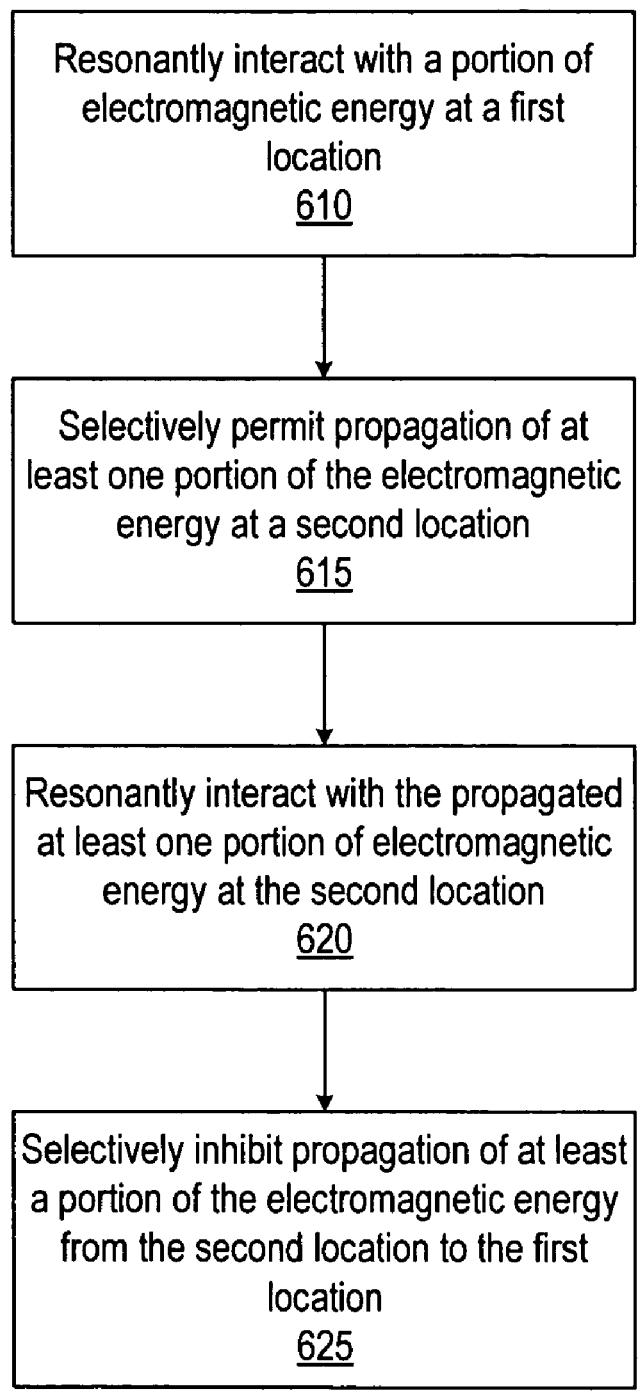
FIG. 6 is a flow diagram illustrating a method of selectively directing electromagnetic radiation in accordance with some of the embodiments.

Referring to FIG. 6, a flow diagram illustrating a method of selectively directing electromagnetic radiation in accordance with some of the embodiments is shown. The method begins at block 610 whereupon a portion of electromagnetic energy is resonantly interacted with at a first location. In one embodiment, this may be accomplished by a self-resonant body such as self-resonant body 110 (FIG. 1). At block 615, at least a portion of the electromagnetic energy is selectively permitted to propagate from the first location to the second location. In one embodiment, this may be accomplished by a directional device such as directional device 115 (FIG. 1). At block 620, at least a portion of the electromagnetic energy is interacted with at a second location. In one embodiment, this may be accomplished by a self-resonant body such as self-resonant body 120 (FIG. 1). At block 625, at least a portion of the electromagnetic energy is inhibited from propagating from the second location to the first location. In one embodiment, this may be accomplished by a directional device such as directional device 115 (see FIG. 1).

Figure 7:
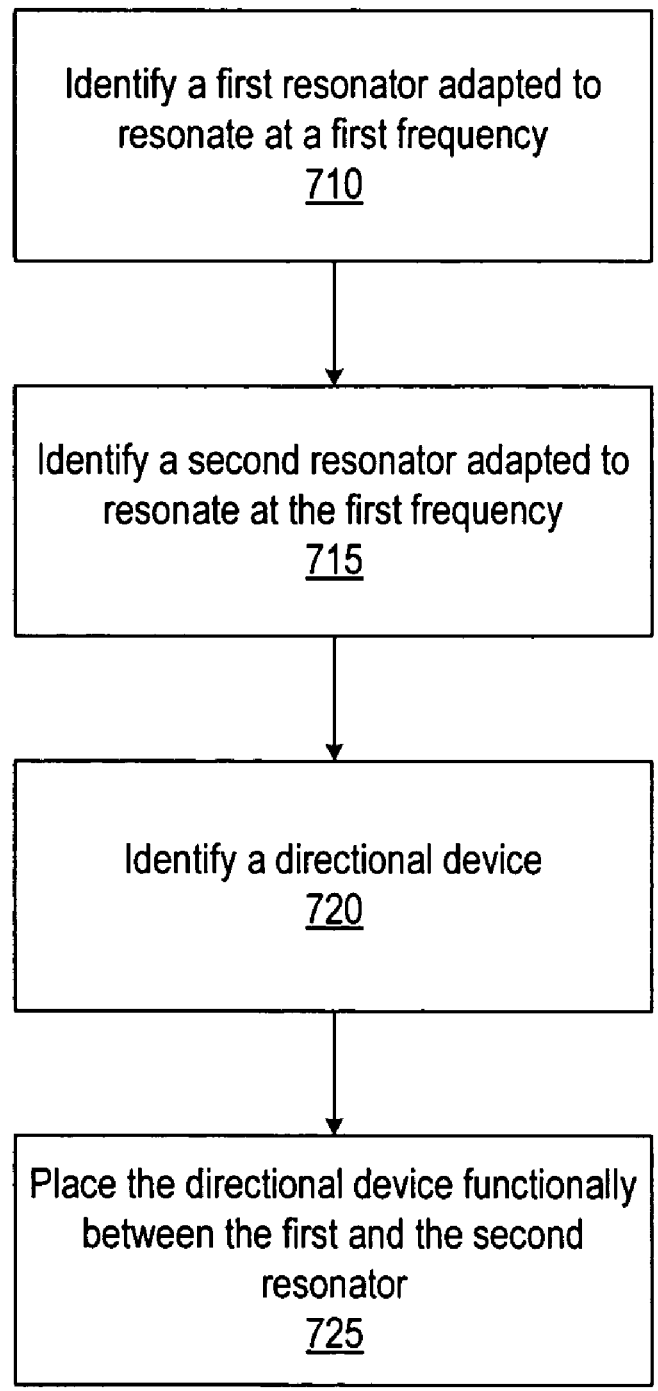
FIG. 7 is a flow diagram illustrating a method for producing an element for interacting with electromagnetic radiation in accordance with some of the embodiments.

Referring to FIG. 7, a flow diagram illustrating a method for producing an element for interacting with electromagnetic radiation in accordance with some of the embodiments is shown. The method begins at block 710 whereupon a first resonator adapted to resonate at a first frequency is identified. In one embodiment, the resonator identified may be self-resonant body 110 (FIG. 1). At block 715, a second resonator adapted to resonate at the first frequency is identified. In one embodiment, the resonator identified may be self-resonant body 120 (FIG. 1). At block 720, a directional device is identified. In one embodiment, the identified directional device may be directional device 115 (FIG. 1). At block 725, the directional device is interposed functionally between the first resonator and the second resonator to produce the element.

Figure 8:
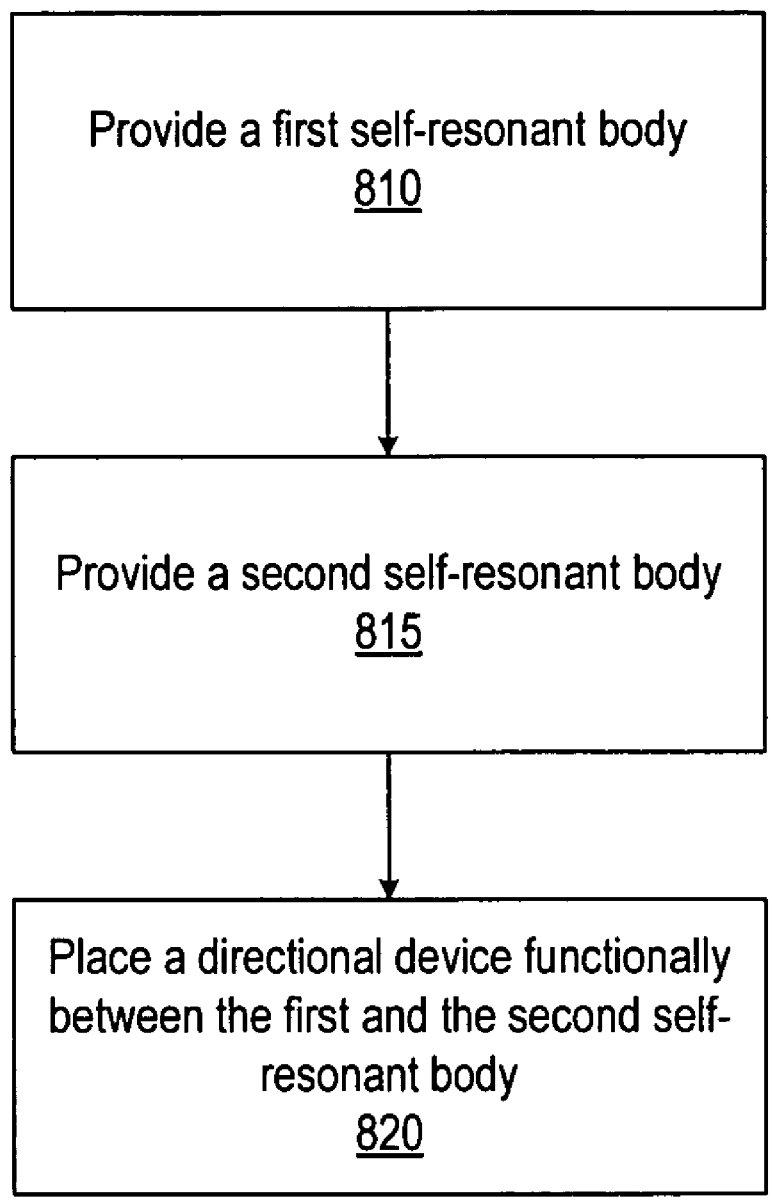
FIG. 8 is a flow diagram illustrating a method for producing an apparatus for interacting with electromagnetic radiation in accordance with some of the embodiments.

Referring to FIG. 8, a flow diagram illustrating a method for producing an apparatus for interacting with electromagnetic radiation in accordance with some of the embodiments is shown. The method begins at block 810, whereupon a first self-resonant body is provided. In one embodiment, the first self-resonant body provided may be self-resonant body 110 (FIG. 1). At block 815, a second self-resonant body is provided. In one embodiment, the second self-resonant body provided may be self-resonant body 120 (FIG. 1). At block 820, a directional device is interposed between the first self-resonant body and the second self-resonant body. In one embodiment, the directional device may be directional device 115 (FIG. 1).

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In a general sense, those skilled in the art will recognize that the various embodiments described herein can be implemented, individually and/or collectively, by various types of electrical or electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably countable", to each other to achieve the desired functionality. Specific examples of operably countable include but are not limited to physically mateable and/or physically interacting components and/or wirelessly intractable and/or wirelessly interacting components and/or logically interacting and/or logically intractable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. An apparatus for interacting with electromagnetic radiation, the apparatus comprising:
   a first self-resonant body;
   a second self-resonant body; and
   a directional device between the first self-resonant body and the second self-resonant body, wherein the directional device is adapted to inhibit propagation of a first electromagnetic radiation signal from the second self-resonant body to the first self-resonant body.

2. The apparatus of claim 1 wherein the directional device is adapted to permit propagation of a second electromagnetic radiation signal received from the first self-resonant body to the second self-resonant body.

3. The apparatus of claim 1 wherein the directional device comprises:
   a first polarizer, wherein the first polarizer has a first axis of polarization;
   a rotator adjacent to the first polarizer, wherein the rotator is adapted to rotate a polarization axis of an incident electromagnetic radiation signal by a first angle; and
   a second polarizer adjacent to the rotator, wherein the second polarizer has a second axis of polarization, and wherein the first axis of polarization and the second axis of polarization are different.

4. The apparatus of claim 3 wherein the rotator includes a Faraday rotator.

5. The apparatus of claim 3 wherein the second axis of polarization is oriented at approximately 45° with respect to the first axis of polarization, and wherein the first angle is approximately 45°.

6. The apparatus of claim 1 wherein the directional device includes a photonic crystal.

7. The apparatus of claim 6 wherein the photonic crystal includes a portion having non-reciprocal properties.

8. The apparatus of claim 7 wherein the photonic crystal is adapted to inhibit electromagnetic radiation from propagating along a first direction, the first direction being a direction of propagation of electromagnetic radiation from the second self-resonant body to the first self-resonant body.

9. The apparatus of claim 6 wherein the first self-resonant body and the second self-resonant body are embedded into the photonic crystal.

10. The apparatus of claim 1 wherein the first self-resonant body and the second self-resonant body are selected from the group consisting of: nanorods, antennas, atoms, and quantum dots.

11. The apparatus of claim 1 further comprising:
    a first array of self-resonant bodies, wherein the first array of self-resonant bodies includes the first self-resonant body; and
    a second array of self-resonant bodies, wherein the second array of self-resonant bodies includes the second self-resonant body.

12. The apparatus of claim 1 further comprising:
    a third self-resonant body spatially separate from the first and second resonant bodies; and
    a second directional device interposed functionally between the second and third self-resonant bodies.

13. The apparatus of claim 12 wherein the second directional device is operative to inhibit propagation of electromagnetic radiation from the third resonant body to the second resonant body.

14. The apparatus of claim 13 wherein the first, second and third self-resonant bodies define a substantially sequential propagation path.

15. An electromagnetic radiation element comprising:
    a first set of one or more resonators, wherein the first set of resonators is adapted to facilitate the propagation of electromagnetic radiation signals;
    a second set of one or more resonators, wherein the second set of resonators is adapted to facilitate the propagation of electromagnetic radiation; and
    a directional device functionally between all or a portion of the first set of resonators and all or a portion of the second set of resonators, wherein the directional device is adapted to inhibit a first electromagnetic signal received from the second set of resonators to propagate to the first set of resonators, and wherein the directional device is adapted to permit a second electromagnetic signal received from the first set of resonators to propagate to the second set of resonators.

16. The apparatus of claim 15 wherein the directional device comprises:
    a first polarizer, wherein the first polarizer has a first axis of polarization;
    a rotator functionally adjacent to the first polarizer, wherein the rotator is adapted to rotate a polarization axis of an incident electromagnetic radiation signal by a first angle; and
    a second polarizer functionally adjacent to the rotator, wherein the second polarizer has a second axis of polarization, and wherein the first axis of polarization and the second axis of polarization are different.

17. The apparatus of claim 16 wherein the rotator includes a Faraday rotator.

18. The apparatus of claim 16 wherein the second axis of polarization is oriented at approximately 45° with respect to the first axis of polarization, and wherein the first angle is approximately 45°.

19. The apparatus of claim 15 wherein one or more resonators in the first set of resonators and one or more of the resonators in the second set of resonators are selected from the group consisting of: nanorods, antennas, atoms, and quantum dots.

20. The apparatus of claim 15 further comprising one or more additional directional devices wherein the additional directional devices are interposed functionally between selected resonators from the first set of resonators and the second set of resonators.

21. The apparatus of claim 15 wherein the directional device includes a non-reciprocal photonic crystal, wherein the non-reciprocal photonic crystal is adapted to inhibit electromagnetic radiation signals from propagating along a first direction, the first direction being a direction from the second set of resonators to the first set of resonators.

22. The apparatus of claim 21 wherein the first set of resonators and the second set of resonators are embedded into the non-reciprocal photonic crystal.

23. The apparatus of claim 15 wherein the first set of resonators includes a first array of one or more resonators and wherein the second set of resonators includes a second array of one or more resonators.

24. The apparatus of claim 15 further comprising:
a third set of one or more resonators spatially separate from the first and second sets of resonators; and
a second directional device interposed functionally between the second set of resonators and third set of resonators.

25. The apparatus of claim 24 wherein the second directional device is operative to inhibit propagation of electromagnetic radiation from the third set of resonators to the second set of resonators.

26. The apparatus of claim 25 wherein the first, second and third sets of resonators define a substantially sequential propagation path.

27. A method of directing electromagnetic energy, comprising:
resonantly interacting with a portion of the electromagnetic energy at a first location;
selectively permitting propagation of at least one portion of the electromagnetic energy from the first location to a second location;
resonantly interacting with the propagated at least one portion of the electromagnetic energy at the second location; and
selectively inhibiting propagation of at least a portion of the electromagnetic energy from the second location to the first location.

28. The method of claim 27 wherein the selectively inhibiting propagation of electromagnetic energy comprises:
polarizing the electromagnetic energy from the second location along a first axis of polarization;
rotating an axis of polarization of the electromagnetic energy by a first angle; and
polarizing the electromagnetic energy along a second axis of polarization, thereby inhibiting propagation of the electromagnetic energy from the second location to the first location.

29. The method of claim 28 wherein the second axis of polarization is oriented at approximately 45° with respect to the first axis of polarization, and wherein the first angle is approximately 45°.

30. The method of claim 27 wherein the selectively inhibiting propagation of the electromagnetic energy comprises directing the electromagnetic energy to a photonic crystal having non-reciprocal properties.

31. The method of claim 27 wherein the resonantly intercepting comprises directing the electromagnetic energy to one or more resonators selected from the group consisting of: nanorods, antennas, atoms, and quantum dots.

32. The method of claim 27 further comprising selectively permitting propagation of at least a portion of the electromagnetic energy from the second location to a third location.

33. The method of claim 32 further comprising resonantly interacting with the propagated as least one portion of the electromagnetic energy at the third location.

34. The method of claim 33 further comprising selectively inhibiting propagation of the electromagnetic energy from the third location to the second location.

35. A method for producing an element for interacting with electromagnetic radiation signals, the method comprising:
identifying a first resonator adapted to resonate at a first frequency;
identifying a second resonator adapted to resonate at the first frequency;
identifying a directional device; and
interposing the directional device functionally between the first resonator and the second resonator, wherein the directional device is adapted to inhibit a first electromagnetic signal at the first frequency from propagating from the second resonator to the first resonator, and wherein the directional device is adapted to substantially permit a second electromagnetic signal at the first frequency from propagating from the first resonator to the second resonator.

36. The method of claim 35 wherein the identifying the directional device comprises:
identifying a first polarizer and a second polarizer adapted to polarize incident electromagnetic radiation at the first frequency respectively along a first axis and a second axis;
orienting the first polarizer and the second polarizer functionally adjacent from each other such that the second axis and the first axis are at a first angle to each other;
identifying a rotator adapted to rotate a polarization axis of the incident electromagnetic radiation by a first angle; and
interposing the rotator functionally between the first and the second polarizer, thereby inhibiting the electromagnetic radiation from propagating from the second polarizer to the first polarizer.

37. The method of claim 36 wherein the rotator includes a Faraday rotator.

38. The method of claim 36 wherein the second axis is oriented at approximately 45° with respect to the first axis, and wherein the first angle is approximately 45°.

39. The method of claim 35 wherein the identifying the directional device comprises identifying a non-reciprocal photonic crystal that is adapted to inhibit electromagnetic radiation at the first frequency from propagating from the second resonator to the first resonator.

40. The method of claim 35 wherein the first resonator and the second resonator are selected from the group consisting of: nanorods, antennas, atoms, and quantum dots.

41. The method of claim 35 further comprising:
identifying a first array of one or more resonators adapted to resonate at the first frequency, wherein the first array of resonators includes the first resonator; and
identifying a second array of one or more resonators adapted to resonate at the first frequency, wherein the first array of resonators includes the second resonator.

42. The method of claim 35, further comprising:
identifying a third resonator adapted to resonate at the first frequency;
identifying a second directional device; and
interposing the second directional device functionally between the second resonator and the third resonator, wherein the second directional device is adapted to inhibit a third electromagnetic signal at the first frequency from propagating from the third resonator to the second resonator, and wherein the second directional device is adapted to substantially permit a fourth electromagnetic signal at the first frequency from propagating from the second resonator to the third resonator.

43. A method for producing an apparatus for interacting with electromagnetic radiation, the method comprising interposing a directional device functionally between a first self-resonant body and a second self-resonant body, wherein the directional device is adapted to inhibit a first electromagnetic radiation signal received from the second self-resonant body to propagate to the first self-resonant body.

44. The method of claim 43 wherein the directional device is adapted to permit a second electromagnetic radiation signal received from the first self-resonant body to propagate to the second self-resonant body.

45. The method of claim 43 wherein interposing the directional device comprises:
interposing a first polarizer, wherein the first polarizer has a first axis of polarization;
interposing a rotator functionally adjacent to the first polarizer, wherein the rotator is adapted to rotate a polarization axis of an incident electromagnetic radiation signal by a first angle; and
interposing a second polarizer functionally adjacent to the rotator, wherein the second polarizer has a second axis of polarization, and wherein the first axis of polarization and the second axis of polarization are different.

46. The method of claim 45 wherein the rotator includes a Faraday rotator.

47. The method of claim 45 wherein the second axis of polarization is oriented at approximately 45° with respect to the first axis of polarization, and wherein the first angle is approximately 45°.

48. The method of claim 43 wherein the interposing the directional device includes interposing a non-reciprocal photonic crystal adapted to inhibit the first electromagnetic radiation signal from propagating.

49. The method of claim 48 further comprising embedding the first self-resonant body and the second self-resonant body into the non-reciprocal photonic crystal.

50. The method of claim 43 wherein the first self-resonant body and the second self-resonant body are selected from the group consisting of: nanorods, antennas, atoms, and quantum dots.

51. The method of claim 43 further comprising interposing the directional device functionally between a first array of self-resonant bodies and a second array of self-resonant bodies, wherein the first array includes the first self-resonant body and wherein the second array includes the second self-resonant body.

52. The method of claim 43 further comprising interposing a second directional device functionally between the second self-resonant body and a third self-resonant body, wherein the second directional device is adapted to inhibit a second electromagnetic radiation signal received from the third self-resonant body to propagate to the second self-resonant body.

* * * * *